May 5, 1953  J. N. BRUCE  2,637,572
SELF-SEALING COUPLING

Filed July 14, 1950  2 SHEETS—SHEET 1

Inventor
John N. Bruce

By George Renehan
Attorney

May 5, 1953
J. N. BRUCE
2,637,572
SELF-SEALING COUPLING
Filed July 14, 1950
2 SHEETS—SHEET 2
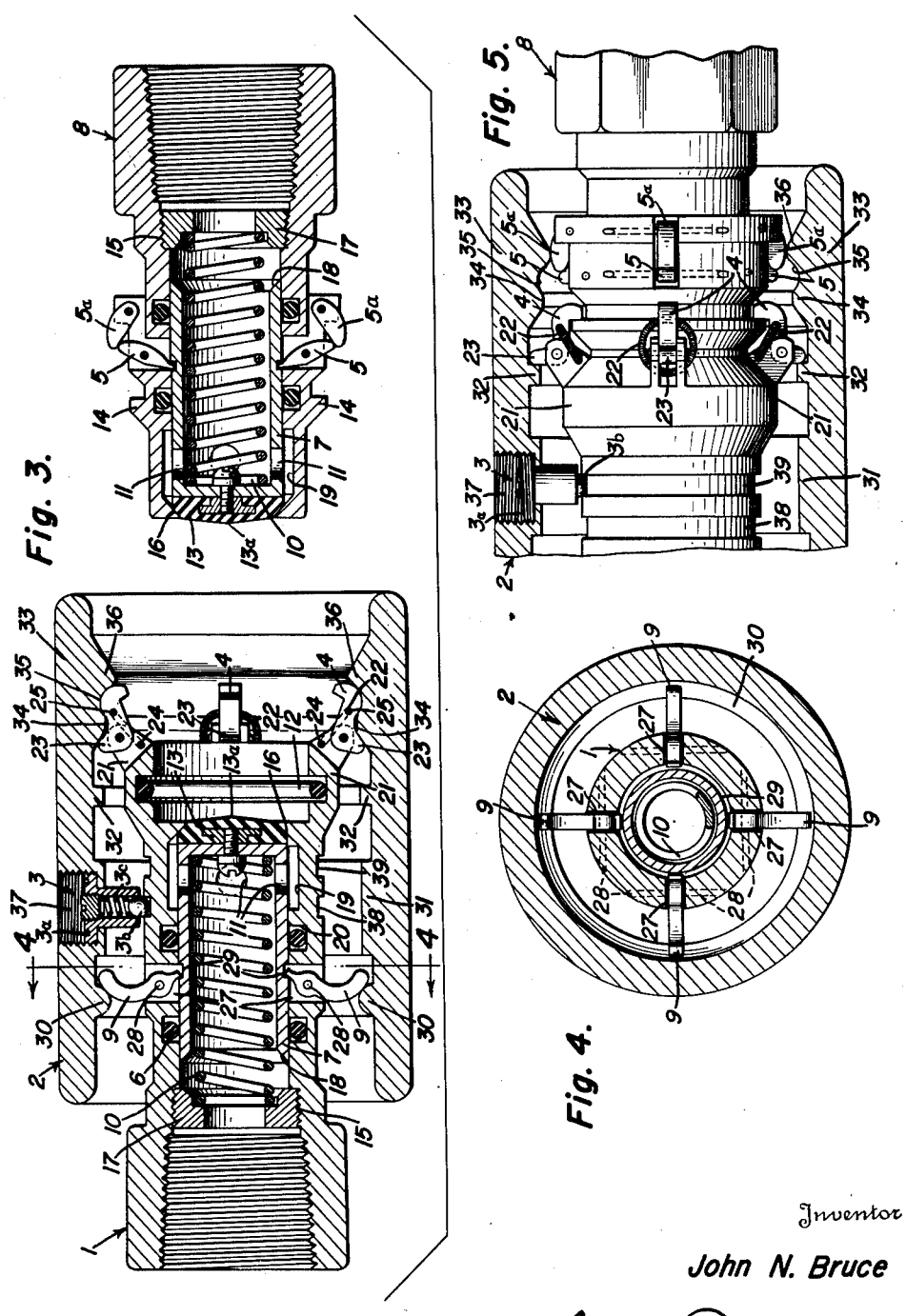
Inventor
John N. Bruce
By George Renehan
Attorney Patented May 5, 1953

2,637,572

UNITED STATES PATENT OFFICE 2,637,572

SELF-SEALING COUPLING

John N. Bruce, Edgewood, Md., assignor to the United States of America as represented by the Secretary of the Army Application July 14, 1950, Serial No. 174,474

5 Claims. (Cl. 284—4)

(Granted under Title 35, U. S. Code (1952), sec. 266)

The invention described herein may be manufactured and used by or for the Government for governmental purposes without the payment to me of any royalty thereon.

The present invention relates to a coupling for fluid conveying conduits. More particularly, the invention relates to a valved self-sealing coupling having a positive no drip feature adapted to be automatically operated when the coupling is disconnected.

It has long been a problem in connecting conduits, to provide an automatic coupling which would operate without any loss of the material conducted. Such a device would be especially desirable in handling highly corrosive or valuable materials when leakage would be costly. To solve this problem it is necessary to provide an arrangement whereby the conduits will have to be connected prior to fluid flow, and conversely fluid flow will have to be terminated before the conduits are disconnected. Heretofore this has not been attainable as the automatic opening and closing feature of the prior art responded by coaction between the closing means. Thus for example, the closure member on each coupling half might have an extension thereon which engages its opposite member prior to locking the halves forcing both to open upon engagement. This type of automatic coupling permits the flow of the fluid while the couple members are unlocked with the result that loss of valuable or dangerous material is often attendant to the coupling and uncoupling. I have devised an automatic coupling wherein the locking means of the coupling halves are engaged and effect the locking thereof independently of the opening and closing of the conduit means therethrough.

It is accordingly an object of my invention to provide a quick acting coupling adapted to automatically close the coupling halves prior to separation and connect the coupling halves prior to permitting flow therethrough.

It is a further object of my invention to provide a self-sealing coupling adapted to have its conduit open and close independently of the engaging and locking of the separable coupling halves thereof.

It is a further object of my invention to provide a coupling that will prevent any ingress of foreign matter into the conduits upon uncoupling.

It is a further object of my invention to provide a self-sealing coupling which is cheap in cost, easy to attach, efficient in operation and simple in construction.

Other objects and advantages will be apparent in the description which follows and when taken in conjunction with the drawing depicting a typical form of my invention in which:

Figure 3 is a sectional view similar to Figure 2, showing the arrangement of the parts when the coupling is disconnected.

Fig. 4 is a sectional view taken on the line 4—4 of Fig. 3 showing the circumferential arrangement of the operating means.

Fig. 5 is a fragmentary view, part in section and part in elevation, showing the arrangement of various elements in connection with the external portion of the tubular members.

Figure 1:
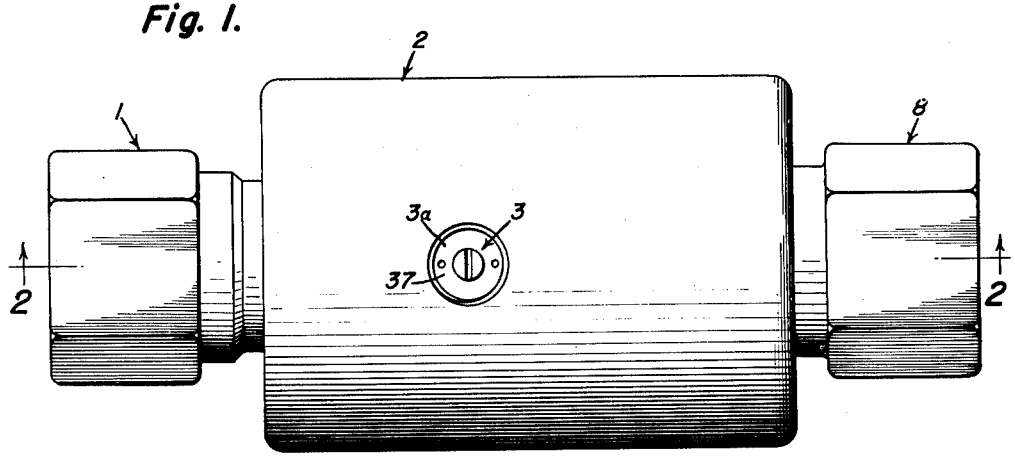
Figure 1 is a top view of the coupling.
Figure 2:
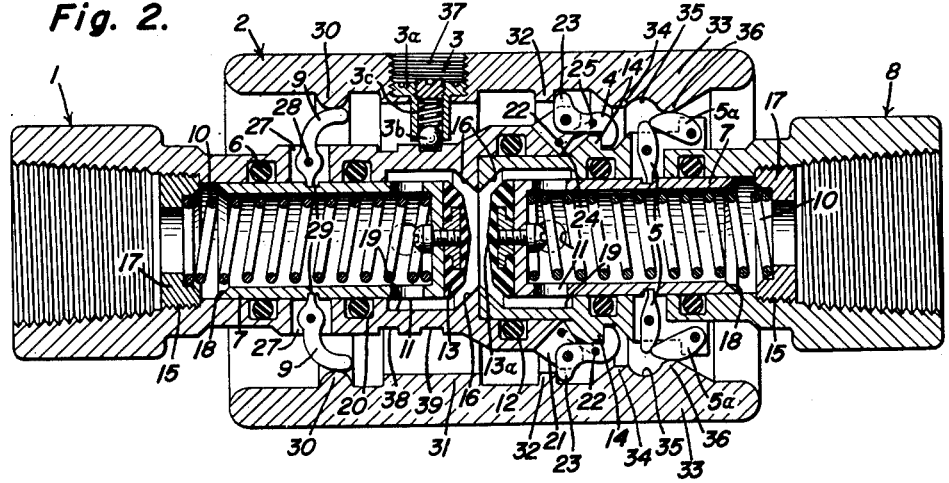
Figure 2 is a sectional view taken on the line 2—2 of Figure 1, showing the arrangement of the parts thereof in connected position.

My invention consists essentially in two interlocking members, each arranged for connection to a conduit and having a closure valve therein, and means to lock said members together and open said closure valves. The coupling shown in the drawing is comprised of three major parts, a male half 3, and a female half 1, and an operating sleeve 2.

Each half comprises a tubular member internally threaded at one end to engage a conduit. The tubular member is internally flanged and threaded as at 15 to receive therein a sleeve screw 17 and again internally flanged at 18, to receive therein the valve member 7 in a sliding engagement. Forward of flange 18, the tubular members are grooved at 19 to provide passage space between the sides of the valve members and the walls of the tubular members and then tapered inwardly as at 16 to provide a valve seat for the valve member.

Mounted within each tubular member is a cylindrical valve member 7 of a diameter to permit it to slidably engage the internal walls of the flange 18. The valve member is of a length somewhat less than the distance between the valve seat and sleeve screw 17 thus permitting it to slide between the seat and screw. The valve is tubular with the end engaging the valve seat being closed, however, adjacent this closed end, the valve is radially bored as at 11 to present valve ports which permit communication between the interior of the valve and groove 19; a helical spring 10 is located within the valve and extends axially along the length thereof with one end being received in a recess of the sleeve screw 17 and the other end abutting against the closed end of the valve. The closed end of the valve is covered on the outside with a valve head 13 of resilient material such as rubber or neoprene and securely held in position by a machined screw. The valve head is formed to engage the valve seat in a tight leakproof manner when the valve is actuated by the spring 10; both members being forwardly tapered to prevent ingress or egress of any material when so engaged. In addition the outer portion of resilient valve heads 13 is slightly tapered as at 13a so as to squeeze the liquid between the two valve heads back into the coupling halves when the valves close.

The female half 1 extends outward beyond its valve seat as at 21 to provide a recess adapted to receive the coupling half 8. At the end of extension 21 a coupling lock 4 is located which is adapted to engage a circumferential lip on the couple 8, to securely hold the coupling halves together. The lock 4 comprises a dogleg clamp pivotally mounted on the extension and shaped so as to have a boss 23 extending radially outward when the clamp is in the engaging position. The extension 21 has an opening adjacent to the lock 4 as at 24 and receives therein a circular spring 22 which passes through opening 25 on the side of the dogleg 4. The spring 22 closes upon itself and serves as a force tending to rotate lock 4 inwardly. By engaging boss 23 it is possible to operate the dogleg 4 against spring 22.

Both halves 1 and 8 have radial openings 27 extending into the interior along the flange portions 18. The walls forming the openings are tapped and adapted to receive therein pin 28 in locking engagement. Valve closing dogs 9 and 5 extend through the radial openings 27 into the interior of halves and are pivotally held therein by pin 28 which passes through openings in the dogs.

Valve closing dog 9 extends outwardly of the female half and is curved toward the forward end thereof and is rotatable when subjected to an engaging thrust. The size of the opening 27 and the portion of the dog therein are such as to limit the amount of rotation by permitting an abutting engagement between the portion of the dog extending into the half and the walls of the opening. When the abutting occurs the extending portion of the dog is recessed in the opening 27 with the outermost portion thereof flush with the interior wall of the coupling half. The valve member 7 is circumferentially grooved at 29 to a sufficient depth to receive therein the extending portion of dog 9 during the entire arc of travel while it is rotating thus it is seen that the pressing inward on the forwardly extending portion of dog 9, it is possible to slide the valve member 7 back against spring 10 and that by placing the groove in a forward portion of the valve relative to the opening 27 when the valve is seated, it is possible to open and close it.

Valve closing dog 5 operates in a manner similar to dog 9. It extends through opening 27 of half 8 and is received in a groove in the valve therefor. By actuating dog 5 it is possible to seat and unseat the valve of the male half 8. Located rearward of dog 5 is cooperating dog 5a which is pivotally mounted on half 8 and free to rotate through an angle limited by the wall of the half and the valve closing dog 5. The cooperating dog is so arranged and shaped that an inward thrust upon it will rotate dog 5 so as to move the valve of half 8 rearward against spring 10. By placing the groove 29 in a forward portion of the valve when it is seated it is possible to open and close the valve by acting upon the cooperating dog with an inward thrust.

Thus it is seen that by placing inward thrusts upon closing dog 9 and cooperating dog 5a simultaneously, the valves on male and female halves open together. Coupling half 8 also has an exterior lip or shoulder 14 circumferentially thereon and located so that it can be engaged by coupling lock 4 when half 8 is received in extension 21.

Coupling halves 1 and 8 are circumferentially grooved in front of and in back of radial opening 27 and receive therein an O ring 6 made of any of the well known hydraulic packings. Ring 6 is of sufficient diameter to engage the outer walls of valves 7 in leakproof engagement and thus prevent any leakage of fluid through openings 27. In addition to ring 6, coupling half 8 is circumferentially grooved in the extension portion 21 and receives therein an O ring 12 of hydraulic packing material of sufficient diameter to engage the outer wall of coupling half 8 in a leakproof arrangement.

In order to coordinate the movement of lock 4, valve control dog 9 and cooperating dog 5a, I have provided an operating sleeve 2 and have appropriately arranged bosses and grooves thereon. The operating sleeve consists of a tubular member of a length sufficient to engage all of the locks and dogs on the couplings when they are in an engaging position. The interior of the sleeve is of a constant diameter and has circumferential protrusions thereon at four different places. The first protrusion comprises bead 30 which is located inwardly from one end of the sleeve and is adapted to engage the forward and outward portion of valve closing dog 9 delivering thereto an inward thrust. The second protrusion is located forward of bead 30 and comprises a wide boss 31 which serves as a housing for sleeve mounting lock assembly 3. The third protrusion is located forward of boss 31 and comprises a narrow boss 32, the side of which is adapted to abut the extension 23 of coupling lock 4 and thereby prevent any uncoupling of the halves while the valves are unseated. Protrusions 30, 31 and 32 all extend preferably the same distance into the interior of the sleeve and do not interfere with the movement of the sleeve during mounting thereof on coupling half 1. The fourth protrusion is located forward of boss 32 and adjacent to the end of the sleeve remote from bead 30; it comprises a large bead 33 extending radially inward beyond the three other protrusions. This bead 33 limits the movement of the sleeve on coupling half 1 by abutting against extension 21 thereof. Bead 33 is leveled off along the innermost side as at 34 and centrally grooved at 35 to provide a recess to receive the head and shoulder portions of lock 4 when the latter is forced to unlock by abutting extension 23 with the inner side wall of bead 33. It is to be noted that the inner side of the bead has been planed enough to permit it to ride over the extension 21 so that the inner wall thereof may engage extension 23 of lock 4. It is to be further noted that by controlling the spacing of protrusions 33 and 32 the amount of delay in uncoupling the halves after closing the valves may be controlled since the halves are not uncoupled until extension 23 and bead 33 meet. The remaining high portion 36 of bead 33 is adapted to engage cooperating dog 5a delivering thereto an inward thrust which acts on dog 5 to open valves 7 of coupling half 8.

Operating sleeve 2 has an opening therein as at 37 which extends through at boss 31. The walls surrounding the opening threadedly receive therein sleeve lock assembly 3. The assembly comprises a sleeve lock housing 3a which is in the form of a sleeve screw having a hollow extension thereon. The sleeve portion is internally and externally threaded as shown with the external thread engaging the walls of the sleeve. A ball lock and spring 3b and 3c are received in the hollow stem with the ball abutting against the exterior wall of coupling half 1. The sleeve screw receives a cap in threaded engagement which comprises spring 3c forcing the ball 3b into a tight engagement with half 1. The external side wall of coupling 1 is circumferentially grooved at 38 and 39 to receive therein spring-pressed ball 3b in locking arrangement as the sleeve slides from open to closed position. The grooves are so located that when the ball is in groove 38 the protrusions are out of contact with their coacting elements on the coupling halves and when the ball is in groove 39, the reverse condition prevails and the protrusions and coacting elements are abutting each other.

While I have described the arrangement of parts in terms of single elements, it is to be understood that the description is meant to include an arrangement wherein a plurality of the various dogs and locks might be used to better advantage. A plurality of closing dogs 9 and 5 together with coupling lock 4 and sleeve lock 3 should be employed on large coupling units, the additional units being circumferentially spaced about the coupling halves and sleeve.

The sleeve 2 is carried on the female coupling half 1 and is mounted thereon after the doglegs and before the valve 7. After the dogs 4 and 9 have been mounted on half 1, the sleeve without the sleeve locking assembly, is passed over half 1 keeping the extending portion of dog 9 pressed forward so that bead 30 may pass over it. After the bead has passed over the dog, opening 37 is alined with groove 38 and the sleeve housing assembly inserted therein, at the same time permitting the dog 9 to rotate so that the interior protruding portion thereof is pressed forward and recessed in opening 27. O rings 6 and valve 7 are then inserted in the half together with spring 10 and sleeve screw 17. The half and sleeve may be disassembled in the reverse order; lock 4 will be revolved through the action of spring 22 so as to remove extension 23 from the path of travel of protrusion 30, 31 and 32 of sleeve 2.

The coupling operates in the following manner. With sleeve 2 pulled back in the open position as shown in Figure 3, valve 7 is seated on the valve seat, lock 4 is held in the open position by bead 33 and dog 9 is just out of engagement with groove 28; the valve coupling half 8 is also seated and dog 5 is just out of engagement with groove 29 and cooperating dog 5a abutting the shoulder of dog 5. The coupling half 8 is inserted in the extension portion of half 1 and the sleeve 2 is pressed forward against the spring-pressed ball 3b until the ball is moved from groove 38 to groove 39. During this travel, bead 33 is moved out of engagement with lock 4 and the latter member rotates under the action of tension spring 22 to engage lip 14 of coupling half 8 and thereby securing the halves together. After the halves have been secured to each other, the further travel of sleeve 2 places bead 30 and portion 36 of bead 33 into contact with dog 9 and cooperating dog 5a respectively, delivering to them an inward thrust simultaneously, while also at the same time bead 32 abuts against extension 23 to reinforce the arresting of forward movement of the sleeve and the securing of the coupling halves.

The inward thrust on dogs 9 and 5a cause the inward portions of dogs 5 and 9 to rotate and move valves 7 back against spring 10. The flow of fluid is through the interior of valve 7, and port valve 11 of one coupling half and through the opposite coupling half by the reverse route. When uncoupling the halves, the procedure is in the reverse order. By moving sleeve 2 rearward on coupling half 1, the valves are first closed and then the halves are uncoupled. Since the valve seats and valve heads are tapered forwardly, all the fluid will be squeezed back into the coupling halves when the valves close since it can go nowhere else while the members are coupled and thus closing the valves prior to uncoupling, the coupling can operate with no loss of liquid.

It will be apparent that I have provided a self-sealing coupling having a positive no drip feature of simple yet rugged construction and which will operate efficiently without undue wear or tear on the parts thereof. Various changes may be made in the specific embodiment of the invention without departing from the spirit thereof or from the scope of the appended claims.

I claim:

1. A coupling comprising a pair of separable coupling halves, each of said coupling halves comprising in combination, a tubular member having a valve seat on one end, the tubular member of one of said coupling halves having a bell-shaped portion extending outwardly from the valve seat end thereof and encircling the valve seat end of the tubular member of the other coupling half, a valve body mounted in each of said tubular members, axially slidable relative thereto and when disconnected, positioned upon said valve seats thereby closing the conduit formed by the tubular members, means forming apertures in the walls of said tubular members, operating means pivotally mounted on each of said tubular members, having an outwardly protruding portion and an inwardly protruding portion extending through the apertures in said walls to actuate said valve bodies, latches pivotally mounted on said bell-shaped portion, each of said latches having an outwardly extending portion and an inwardly extending portion, lip means carried on the outer periphery of the tubular member of said other coupling half and engaged with the inwardly extending portion of said latches, means associated with said latches urging them to rotate about their pivots to their locking position, a sleeve mounted on the tubular member of said latch carrying coupling half and slidable relative thereto from a first position to a second position, beads mounted on the inside of said sleeve and positioned axially with respect to each other to simultaneously actuate the operating means on both tubular members when the coupling halves are coupled and the sleeve is in the second position, and inwardly projecting means also mounted on the inside of said sleeve engaged with the outwardly extending portions of the latches when the sleeve is in the first position thereby preventing the said latches from assuming their locking positions, said projecting means being also so positioned with respect to the beads that as the said sleeve moves from the first position to the second position it disengages from the latches prior to engagement of said beads and operating means when the halves are coupled; and conversely the beads and operating means are disengaged prior to engagement of the extending portion of said latch means and said projecting means as the sleeve moves from the second position to the first position.

2. A coupling comprising a pair of separable coupling halves, each of said coupling halves comprising in combination, a tubular member having a valve seat on one end, the tubular member of one of said coupling halves having a bell-shaped portion extending outwardly from the valve seat end thereof and encircling the valve seat end of the tubular member of the other coupling half, a valve body mounted in each of said tubular members, axially slidable relative thereto and when disconnected, positioned upon said valve seats thereby closing the conduit formed by the tubular members, resilient valve heads mounted on the seating end of said valve bodies, said valve heads protruding beyond the end of said valve seat when the valve bodies are seated and tapered in the direction of protrusion whereby the fluid trapped between the coupling halves will be squeezed outwardly to the valve seat and into the coupling halves when the valve bodies seat themselves, means forming apertures in the walls of said tubular members, operating means pivotally mounted on each of said tubular members, having an outwardly protruding portion and an inwardly protruding portion extending through the apertures in said walls to actuate said valve bodies, latches pivotally mounted on said bell-shaped portion, each of said latches having an outwardly extending portion and an inwardly extending portion, lip means carried on the outer periphery of the tubular member of said other coupling half and engaged with the inwardly extending portion of said latches, means associated with said latches urging them to rotate about their pivots to their locking position, a sleeve mounted on the tubular member of said latch carrying coupling half and slidable relative thereto from a first position to a second position, beads mounted on the inside of said sleeve and positioned axially with respect to each other to simultaneously actuate the operating means on both tubular members when the coupling halves are coupled and the sleeve is in the second position, and inwardly projecting means also mounted on the inside of said sleeve engaged with the outwardly extending portions of the latches when the sleeve is in the first position thereby preventing the said latches from assuming their locking positions, said projecting means being also so positioned with respect to the beads that as the said sleeve moves from the first position to the second position it disengages from the latches prior to engagement of said beads and operating means when the halves are coupled; and conversely the beads and operating means are disengaged prior to engagement of the extending portion of said latch means and said projecting means as the sleeve moves from the second position to the first position.

3. A coupling comprising a pair of separable coupling halves, each of said coupling halves comprising in combination, a tubular member having a valve seat on one end, the tubular member of one of said coupling halves having a bell-shaped portion extending outwardly from the valve seat end thereof and encircling the valve seat end of the tubular member of the other coupling half, a valve body mounted in each of said tubular members, axially slidable relative thereto and when disconnected, positioned upon said valve seats thereby closing the conduit formed by the tubular members, means forming apertures in the walls of said tubular members, operating means pivotally mounted on each of said tubular members, having an outwardly protruding portion and an inwardly protruding portion extending through the apertures in said walls to actuate said valve bodies, latches pivotally mounted on said bell-shaped portion, each of said latches having an outwardly extending portion and an inwardly extending portion, lip means carried on the outer periphery of the tubular member of said other coupling half and engaged with the inwardly extending portion of said latches, means associated with said latches urging them to rotate about their pivots to their locking position, a sleeve mounted on the tubular member of said latch carrying coupling half and slidable relative thereto from a first position to a second position, beads mounted on the inside of said sleeve and positioned axially with respect to each other to simultaneously actuate the operating means on both tubular members when the coupling halves are coupled and the sleeve is in the second position, and inwardly projecting means also mounted on the inside of said sleeve engaged with the outwardly extending portions of the latches when the sleeve is in the first position thereby preventing the said latches from assuming their locking positions, said projecting means being also so positioned with respect to the beads that as the said sleeve moves from the first position to the second position it disengages from the latches prior to engagement of said beads and operating means when the halves are coupled; and conversely the beads and operating means are disengaged prior to engagement of the extending portion of said latch means and said projecting means as the sleeve moves from the second position to the first position, and stop means mounted on the inside of said sleeve intermediate said beads and so positioned as to engage the latches when the sleeve is in the second position thereby preventing any further movement of said sleeve and any unlocking of the latches.

4. A coupling comprising a pair of separable coupling halves, each of said coupling halves comprising in combination, a tubular member having a valve seat on one end, the tubular member of one of said coupling halves having a bell-shaped portion extending outwardly from the valve seat end thereof and encircling the valve seat end of the tubular member of the other coupling half, a valve body mounted in each of said tubular members, axially slidable relative thereto and when disconnected, positioned upon said valve seats thereby closing the conduit formed by the tubular members, means forming apertures in the walls of said tubular members, annular packing rings interposed between the walls of said tubular member and said valve body adjacent said apertures, operating means pivotally mounted on each of said tubular members, having an outwardly protruding portion and an inwardly protruding portion extending through the apertures in said walls to actuate said valve bodies, latches pivotally mounted on said bell-shaped portion, each of said latches having an outwardly extending portion and an inwardly extending portion, lip means carried on the outer periphery of the tubular member of said other coupling half and engaged with the inwardly extending portion of said latches, means associated with said latches urging them to rotate about their pivots to their locking position, a sleeve mounted on the tubular member of said latch carrying coupling half and slidable relative thereto from a first position to a second position, a sleeve lock under compression mounted on said sleeve, annular grooves on the outer periphery of said sleeve carrying tubular member to receive said sleeve lock, when it is in said first position or said second position respectively, beads mounted on the inside of said sleeve and positioned axially with respect to each other to simultaneously actuate the operating means on both tubular members when the coupling halves are coupled and the sleeve is in the second position, and inwardly projecting means also mounted on the inside of said sleeve engaged with the outwardly extending portions of the latches when the sleeve is in the first position thereby preventing the said latches from assuming their locking positions, said projecting means being also so positioned with respect to the beads that as the said sleeve moves from the first position to the second position it disengages from the latches prior to engagement of said beads and operating means when the halves are coupled; and conversely the beads and operating means are disengaged prior to engagement of the extending portion of said latch means and said projecting means as the sleeve moves from the second position to the first position.

5. A coupling comprising a pair of separable coupling halves, each of said coupling halves comprising in combination, a tubular member having a valve seat on one end, the tubular member of one of said coupling halves having a bell-shaped portion extending outwardly from the valve seat end thereof and encircling the valve seat end of the tubular member of the other coupling half, a valve body mounted in each of said tubular members, axially slidable relative thereto and when disconnected, positioned upon said valve seats thereby closing the conduit formed by the tubular members, resilient valve heads mounted on the seating end of said valve bodies, said valve heads protruding beyond the end of said valve seat when the valve bodies are seated and tapered in the direction of protrusion whereby the fluid trapped between the coupling halves will be squeezed outwardly to the valve seat and into the coupling halves when the valve bodies seat themselves, means forming apertures in the walls of said tubular members, annular packing rings interposed between the walls of said tubular member and said valve body adjacent said apertures, operating means pivotally mounted on each of said tubular members, having an outwardly protruding portion and an inwardly protruding portion extending through the apertures in said walls to actuate said valve bodies, latches pivotally mounted on said bell-shaped portion, each of said latches having an outwardly extending portion and an inwardly extending portion, lip means carried on the outer periphery of the tubular member of said other coupling half and engaged with the inwardly extending portion of said latches, means associated with said latches urging them to rotate about their pivots to their locking position, a sleeve mounted on the tubular member of said latch carrying coupling half and slidable relative thereto from a first position to a second position, a sleeve lock under compression mounted on said sleeve, annular grooves on the outer periphery of said sleeve carrying tubular member to receive said sleeve lock, when it is in said first position or said second position respectively, beads mounted on the inside of said sleeve and positioned axially with respect to each other to simultaneously actuate the operating means on both tubular members when the coupling halves are coupled and the sleeve is in the second position, inwardly projecting means also mounted on the inside of said sleeve engaged with the outwardly extending portions of the latches when the sleeve is in the first position thereby preventing the said latches from assuming their locking positions, said projecting means being also so positioned with respect to the beads that as the sleeve moves from the first position to the second position it disengages from the latches prior to engagement of said beads and operating means when the halves are coupled; and conversely the beads and operating means are disengaged prior to engagement of the extending portion of said latch means and said projecting means as the sleeve moves from the second position to the first position, and stop means mounted on the inside of said sleeve intermediate said beads and so positioned as to engage the latches when the sleeve is in the second position thereby preventing any further movement of said sleeve and any unlocking of the latches.

JOHN N. BRUCE.

References Cited in the file of this patent

UNITED STATES PATENTS

| Number | Name | Date |
|---|---|---|
| 678,841 | MacLearn | July 16, 1901 |
| 714,264 | Turakski | Nov. 25, 1902 |
| 1,807,636 | Robin | June 2, 1931 |
| 2,300,483 | Berger et al. | Nov. 3, 1942 |
| 2,512,999 | Bruning | June 27, 1950 |
| 2,543,590 | Swank | Feb. 27, 1951 |

FOREIGN PATENTS

| Number | Country | Date |
|---|---|---|
| 539,014 | Great Britain | Aug. 25, 1941 |